United States Patent [19]
Norkey et al.

[11] Patent Number: 5,100,182
[45] Date of Patent: Mar. 31, 1992

[54] FLUID CONNECTOR

[75] Inventors: Phillip J. Norkey, Jackson; Tom I. Letica, Rochester, both of Mich.

[73] Assignee: U.S. Plastics Corporation, Madison Heights, Mich.

[21] Appl. No.: 585,673

[22] Filed: Sep. 20, 1990

[51] Int. Cl.⁵ .............................................. F16L 39/04
[52] U.S. Cl. ...................... 285/318; 285/319; 285/321
[58] Field of Search ............. 285/319, 921, 308, 318, 285/375, 267, 279

[56] References Cited

U.S. PATENT DOCUMENTS

| | | | |
|---|---|---|---|
| 921,691 | 5/1909 | Friday | 285/319 X |
| 1,714,141 | 5/1929 | Schmitt | 285/375 X |
| 2,247,242 | 6/1941 | Kreidel | 285/231 X |
| 4,026,581 | 5/1977 | Pasbrig | 285/319 X |
| 4,541,658 | 9/1985 | Bartholomew | 285/319 X |
| 4,601,497 | 7/1986 | Bartholomew | 285/319 |
| 4,802,696 | 2/1989 | Chohan et al. | 285/921 X |
| 4,936,544 | 6/1990 | Bartholomew | 285/921 X |
| 4,948,175 | 8/1990 | Bartholomew | 285/319 X |

FOREIGN PATENT DOCUMENTS

| | | | |
|---|---|---|---|
| 2307154 | 8/1974 | Fed. Rep. of Germany | 285/316 |
| 841135 | 5/1939 | France | 285/231 |

*Primary Examiner*—Randolph A. Reese
*Assistant Examiner*—Heather Chun
*Attorney, Agent, or Firm*—Lalos & Keegan

[57] ABSTRACT

A fluid connector generally including a female housing, a male conduit insertable in the female housing in coupling relation therewith, a sealing assembly disposed between the housing and the inserted conduit, and a retainer for releasably retaining the conduit in the housing. A conical compression spring is provided in the housing for forcing the conduit out of the housing unless it is fully and properly inserted and maintained in position by the retainer.

10 Claims, 2 Drawing Sheets

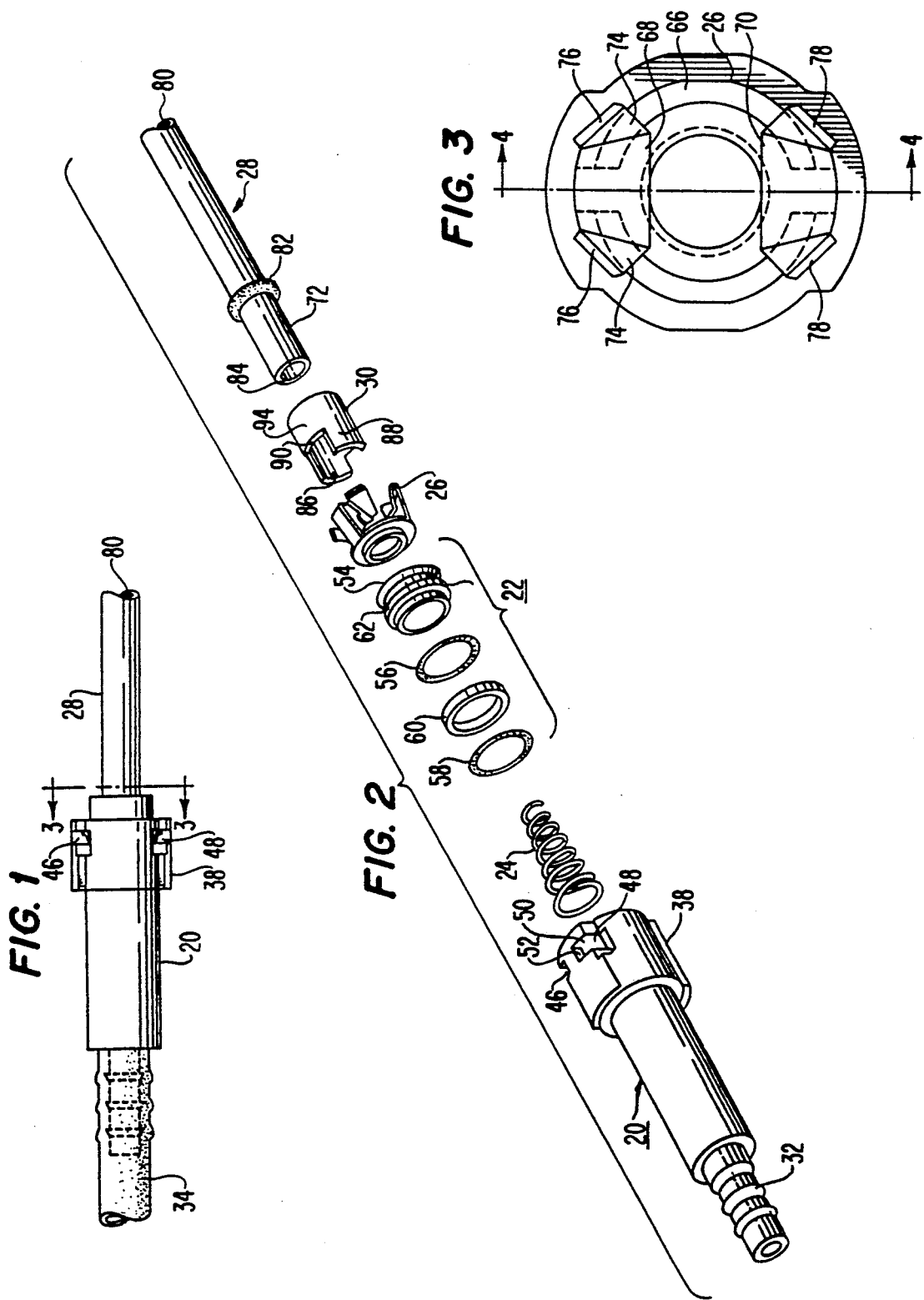

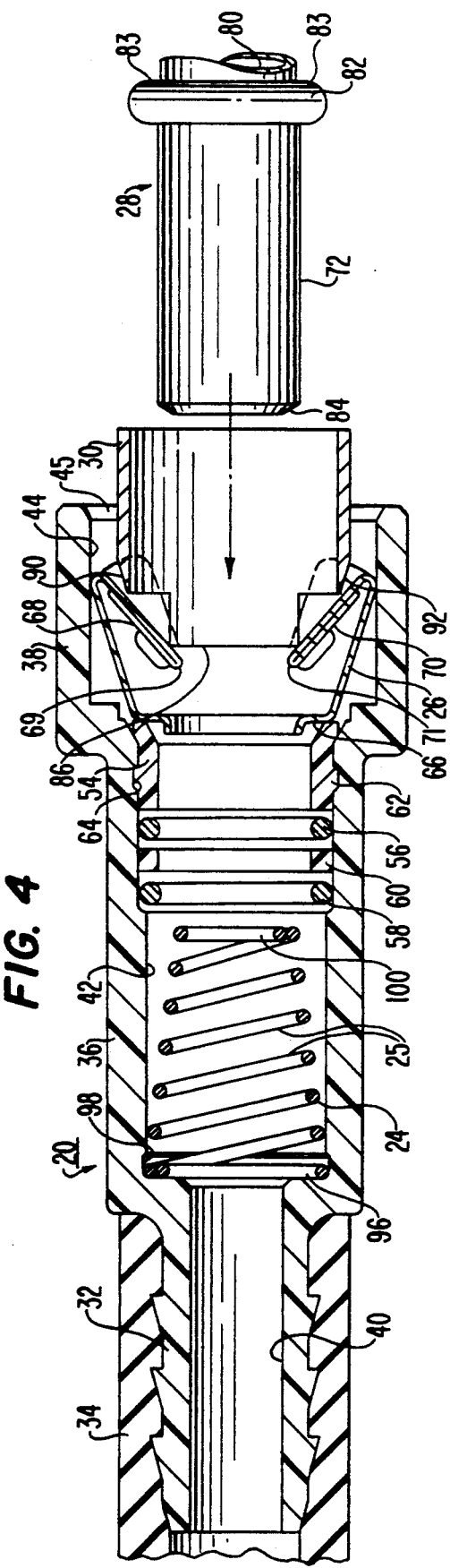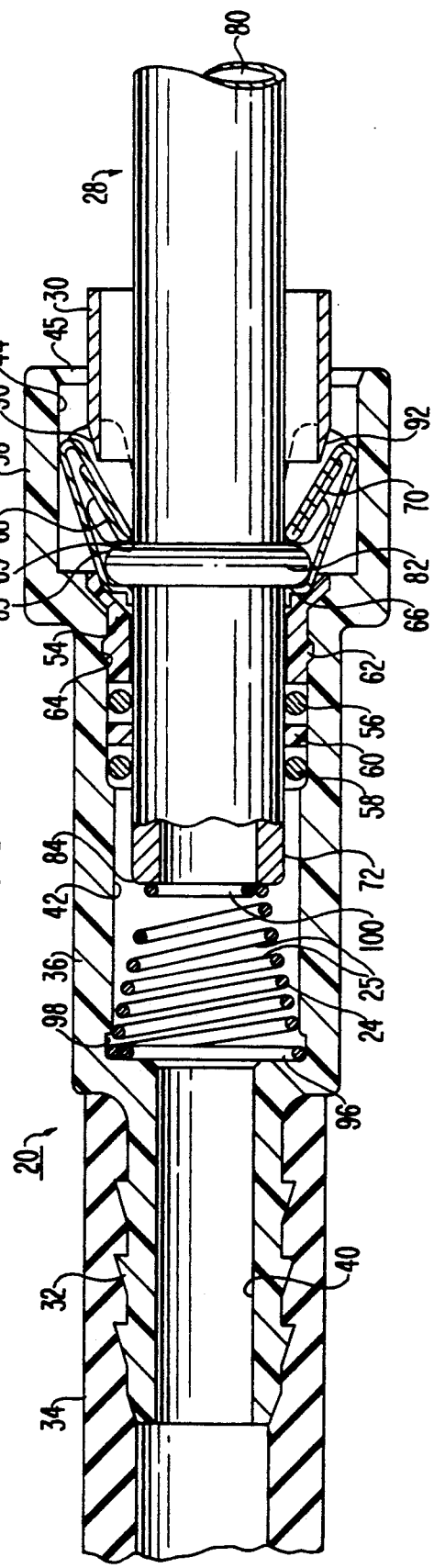

FLUID CONNECTOR

This invention relates to fluid connectors and more particularly to fluid connectors that are adapted to be quickly connected and disconnected. The invention further contemplates a fluid connector that is particularly suitable for use in automotive applications such as in fuel lines, air conditioning systems, power steering and brake systems.

In the prior art, there has been developed a type of quick connector that generally consists of a female housing, a male conduit insertable in the female housing in coupling relation therewith, sealing means disposed between the housing and the inserted conduit and means disposed in the housing for releasably retaining the conduit in coupling relation with the housing. Examples of such type of connector is illustrated and described in U.S. Pat. Nos. 4,819,908 and 4,846,506.

The male conduit member of such connectors typically is provided with an annular flange which is disposed within the female housing member when the members are disposed in coupling relation, and the retainer means typically is interposed between the conduit annular flange and a forwardly facing bearing surface on the housing, usually an annular shoulder. When fluid under pressure is applied to the connector in the coupled condition, tending to eject the male conduit member from the female housing, the force applied to the male conduit member is transmitted through the conduit annular flange and the retainer engaging the bearing surface on the housing, to the housing.

The materials from which the housing members of such connectors are formed usually depend on the pressure requirements of the connector applications. In lower pressure applications such as in automotive fuel line and air conditioning applications, operating in the range of 60 to 300 psi, plastic materials may be used for the housing members. In higher pressure applications such as automotive power steering and brake system applications, operating in the range of 1500 to 3000 psi, metal materials must be used for the housing members.

In such connectors, especially the type of connector described in U.S. Pat. No. 4,846,506, which does not include a shut-off valve in the female housing, problems arise when the male conduit is not fully inserted, i.e., when the retainer is not properly interposed between the conduit annular flange and the housing bearing surface. In this instance, when fluid under pressure is applied, the male conduit is forced out of the female housing.

It is therefore an object of the present invention to provide an improved connector.

It is a further object of the invention to provide a means for urging the conduit out of the housing during assembly of the connector if the conduit is not fully and properly inserted. The person assembling the connector is thereby notified during assembly that the conduit and housing are not properly coupled, rather than under actual operating conditions when fluid under pressure is applied to the connector.

Another object of the invention is to provide a means for urging the conduit out of the housing that is easy to install and maintain in the housing.

Other objects and advantages of the present invention will become more apparent to those persons having ordinary skill in the art to which the present invention pertains from the following description taken in conjunction with the accompanying drawings wherein:

FIG. 1 is a side elevational view of an embodiment of the present invention;

FIG. 2 is a perspective view of the embodiment shown in FIG. 1, illustrating the components thereof in exploded relation;

FIG. 3 is an enlarged cross-sectional view taken along line 3—3 in FIG. 1;

FIG. 4 is a cross-sectional view taken along line 4—4 in FIG. 3, illustrating the female housing and male conduit in an uncoupled relationship;

FIG. 5 is a view similar to the view shown in FIG. 4 illustrating the female housing and male conduit in coupling relationship.

Referring to the drawings, there is illustrated an embodiment of the invention which generally includes a female housing 20, a sealing assembly 22 disposed in the housing, a spring 24 disposed in the housing 20, a retainer 26 disposed within the housing, a male conduit 28 insertable in the housing 20 in coupling relationship therewith and a release member 30 partially extending in the housing 20 and cooperable with the retainer 26 for releasing the male conduit from the female housing.

As best shown in FIGS. 4 and 5, the housing 20 includes a reduced end section 32 adapted to be received within and secured to a flexible fluid line 34, a intermediate section 36 housing the spring 24 and sealing assembly 22, and an enlarged end section 38 housing the retainer 26 and release member 30. Internally, the housing is provided with a longitudinal passageway 40 having a first enlarged section 42 having a substantially circular cross-sectional configuration and a second enlarged section 44 having a substantially oblong cross-sectional configuration with opening 45. As best shown in FIGS. 1 and 2, enlarged section 38 of the housing 20 is provided with a pair of transversely disposed slots 46 and 48 which are disposed on opposite sides of the longitudinal axis of the housing 20, intersect enlarged passageway section 44 and provide a first plurality of circumferentially spaced bearing surfaces 50 lying in a plane disposed perpendicular to the longitudinal axis of the housing and a plurality of circumferentially spaced guide surfaces 52 disposed parallel to the longitudinal axis of the housing.

The housing 20 may be formed by injection molding from any suitable material depending upon the use of the connector. For automotive fuel line applications, the material used should be highly heat resistant and highly chemical resistant. Preferably, for such uses, the housing is formed of a polyphenol sulfide material manufactured by the Phillips 66 Company of Bartlesville, Okla. and sold under the trademark RYTON.

Sealing assembly 22 includes bushing 54, a pair of O-rings 56 and 58, and a spacer 60 disposed between the O-rings. The bushing is provided with an annular projecting portion 62 which snap-fits into a complementary annular groove 64 formed in the wall of enlarged section 42 of the housing passageway to fix the bushing relative to the housing and cause it to function as an integral component of the housing. The O-rings are disposed behind the bushing 54 and are separated by the spacer 60. Preferably, the bushing and the spacer are formed of nylon. The material of the O-rings would depend on the nature of the system medium. For fuel line applications, materials consisting of a fluorocarbon/fluorosilicone blend can be used.

FIG. 4 best illustrates the retainer 26 that includes an. annular section 66 and a pair of identical leg sections 68 and 70. Annular section 66 has an outer diameter sufficient to enable the retainer 26 to engage the rear end of bushing 54 as shown in FIGS. 4 and 5 and an inner diameter sufficient to permit leading end portion 72 of the conduit 28 to be received therethrough as shown in FIG. 5. Leg section 68 is provided with laterally projecting wing portions 74 which in turn are provided with pad portions 76 formed along the rear edges thereof. Pad portions 76 of leg section 68 and similar pad sections 78 of leg section 70 are circumferentially spaced relative to the longitudinal axis of annular section 66 and are adapted to engage circumferentially spaced transverse bearing surfaces 50 formed by transverse slots 46 and 48 when the retainer 26 is disposed in enlarged section 44 of the housing 20 as shown in FIGS. 4 and 5. Typically, the retainer 26 is formed by stamping suitably configured blanks from metal sheet materials and bending the blanks to form the leg sections as described. Preferably, and particularly for applications where the fluid with which the connector is used is corrosive, the retainer members are formed of stainless steel. Retainer 26 is disclosed in further detail in U.S. Pat. No. 4,846,506, incorporated herein by reference.

Conduit 28 is tubular and provides a fluid passageway 80. It includes an annular flange portion 82 spaced from a leading end 84 thereof. Conduit 28 further includes a leading end portion 72 disposed between the leading end 84 and annular flange portion 82. As best shown in FIG. 5, leading end portion 72 has an outside diameter substantially equal to the inside diameter of the bushing 54 and O-rings 56 and 58 so that when the leading end portion 72 of the conduit 2 is fully inserted into the housing 20 so that annular flange portion 82 engages annular section 66 of the retainer 26, the conduit leading end portion 72 will be received within bushing 54, in sealing engagement with O-rings 56 and 58 to provide a fluid tight seal between the conduit 28 and housing 20.

As the conduit 28 is inserted into the housing 20, the engagement of the annular flange portion 82 of the conduit 28 will cam the retainer leg sections of the retainer radially outwardly to permit the annular flange portion to displace past the retaining leg sections of the retainer into engagement with the annular section of the retainer. Once the annular flange portion advances beyond the retainer leg sections of the retainer, the retainer leg sections snap back radially inwardly behind the annular flange portion of the conduit with leading ends 69 and 71 contacting flange trailing surface 83 to obstruct the rearward displacement of the conduit and secure the conduit in coupling relationship with the housing as shown in FIG. 5. The conduit may be formed from any suitable metal or plastic material having sufficient strength characteristics, and the annular flange portion of the conduit similarly may be formed by any suitable method.

Referring to FIGS. 2, 4 and 5, release member 30 consists of a short tubular member 94 having a pair of forwardly projecting sections 86 and 88 and upper and lower beveled cam surfaces 90 and 92. The outside diameter of tubular member 94 is less than the transverse dimension or minor diameter of oblong enlarged section 44 to permit the insertion of the release member 30 into enlarged section 44 of the housing, and the inside diameter of tubular member 94 is sufficiently large to permit the passage of the conduit 28 with annular flange portion 82 therethrough when the release member is mounted in enlarged section 44 of the housing member as shown in FIGS. 4 and 5.

As best shown in FIGS. 4 and 5, cam surfaces 90 and 92 are longitudinally aligned with leg sections 68 and 70 of the retainer so that when the release member inserted in enlarged section 44 of the housing, as shown in FIGS. 4 and 5, is displaced forwardly into engagement with the leg sections of the retainer, the leg sections will be caused to deflect radially outwardly to permit the passage of the annular flange portion 82 of the conduit 28 past the leg sections of the retainer and thus permit the removal of the conduit from the housing. Excessive deflection of the retaining leg portions is prevented by the engagement of extending sections 86 and 88 with the annular section 66 of the retainer thus limiting the forward displacement of cam surfaces 90 and 92 in contact with the retainer leg sections.

While a detailed discussion of the release member 30 and its operation is not necessary to understand or appreciate the present invention, such detailed discussion is provided in U.S. patent application Ser. No. 07/521,391, incorporated herein by reference. Preferably, the release member 30 is formed of nylon or a similar material.

As best shown in FIGS. 2, 4, and 5, spring 24 is contained within first enlarged section 42 of the housing passageway. Spring 24 includes a number of coils 25 and may be straight with a uniform coil diameter or preferably conical with a steadily decreasing coil diameter, as shown in the drawings. A first end 96 of spring 24 is received in annular groove 98 formed in the wall of enlarged housing section 36. As an alternate to an annular groove 98, a flange may be formed on section 36 to seat first end 96 and maintain spring 24 in position within housing 20. Preferably spring 24 is a compression spring made of stainless steel. As shown in FIG. 4, with male conduit 28 removed from female housing 20, spring 24 is fully extended with its forward second end 100 in proximity to O-ring 58. With conduit 28 fully inserted in housing 20, as shown in FIG. 5, spring 24 is compressed by the force of conduit leading end 84 in contact with spring forward end 100, which force is maintained by the cooperative relationship of retainer legs 68, 70 and conduit annular flange portion 82.

If, during assembly, conduit 28 is not inserted a predetermined distance, i.e., far enough into housing 20 such that annular flange portion 82 is displaced past retaining legs 68, 70 and into engagement with retainer annular section 66, then spring 24 will urge conduit 28 back out of the housing. Spring 24 will force conduit 28 out of housing 20 unless the conduit is properly inserted such that rearward axial displacement is prevented by retaining legs 68, 70 acting on conduit annular flange portion 82, i.e., with leg leading ends 69 and 71 in contact with flange trailing surface 83. As will be appreciated from FIG. 5, the mean diameter of the spring coils 25 at forward end 100 must be greater than the diameter of fluid passageway 80 but less than the outside diameter of leading end portion 72 of conduit 28.

The connector as described is assembled by first inserting the spring 24 in the enlarged section 42 of housing 20 until first end 96 is fit into position in annular groove 98. Then, sealing assembly 22, mounted on a tool, is inserted in the enlarged section of the housing until bushing 54 is snapped into position in annular groove 64. The retainer 26 is then positioned in enlarged section 44 so that the annular section thereof engages or is seated on bushing 54. The release member is then inserted into the housing. The female housing portion of the connector is then ready for application to a fuel line. The female housing 20 may be connected to a fuel line such as line 34 simply by inserting the reduced end section 32 in the fluid line in the conventional manner.

When it is desired to connect the male member to the female member, which is connected to the fluid line, the conduit simply is inserted through the release member into enlarged section 44 of the housing so that the annular flange portion thereof engages the retaining leg sections of the retainer to deflect them radially outwardly and permit the annular flange portion to pass between the retaining leg portions into engagement with the annular section of the retainer. The conduit will then be in coupling relation with the housing as shown in FIG. 5. As the conduit is inserted into the housing and the annular flange portion deflects the retaining leg sections to assume the position as shown in FIG. 5, conduit leading end portion 72 will be received within and guided through bushing 54 to place the leading end of the conduit into sealing engagement with the O-rings. The O-rings will thus form a fluid tight seal between the conduit and the housing.

If the conduit 28 is not inserted far enough such that annular flange portion 82 passes beyond the retaining leg sections and into engagement with the retainer annular section, compressed spring 24 will urge the conduit axially out (opposite to the direction of the arrow shown in FIG. 4) of the housing 20. This will signal the person assembling the connector that the conduit has not been properly inserted.

Whenever it is desired to disconnect the conduit from the housing, the housing may be grasped firmly in one hand and the release member is displaced forwardly with the fingers of the other hand so that the retaining leg sections will be cammed radially outwardly to permit the conduit to be withdrawn from the housing. With the retaining leg sections deflected radially outwardly, the annular flange portion of the conduit is free to pass unobstructed past the retainer to be withdrawn from the housing.

With the connector in the coupled condition as shown in FIG. 5 and fluid pressure being applied to fluid line 34, the force of the fluid acts on the conduit tending to eject it from the housing. The force applied to the conduit is transferred through the annular flange of the conduit, the retaining leg sections, the wing portions formed on the retaining leg sections and the pad portions formed on the rear ends of the pad portions engaging bearing surfaces 50, to the housing. All of the load transmitted through the retainer is transferred to the housing exclusively through the pad portions of the retainer which engage transverse bearing surfaces 50 and provide greater bearing surfaces for a greater distribution of the load being transmitted. As mentioned previously, the retainer is described in detail in U.S. Pat. No. 4,846,506.

If not for the apparatus of the present invention, the person assembling the male conduit and female housing might inadvertently fail to insert the conduit a sufficient distance into the housing. The conduit would be forced out of the housing once pressure is applied through the fluid line. With the present invention, if the conduit is not fully inserted, it will be forced out of the housing during assembly, thereby giving an early warning of the problem.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. A fluid connector comprising:
   a housing having a longitudinal passageway with an opening;
   a conduit insertable through said opening and into said longitudinal passageway of said housing, said conduit including a leading end and an annular flange axially spaced from said leading end;
   a retaining means disposed in said housing for retaining said conduit in a fixed position when said conduit has been inserted a predetermined distance into said housing, said retaining means including retaining legs for contacting said annular flange when said conduit is inserted into said passageway;
   a means disposed in said housing and directly containing said leading end of said conduit for urging said conduit axially out of said housing;
   said retaining means including means for preventing said urging means from axially displacing said conduit out of said housing once said conduit has been inserted said predetermined distance.

2. A fluid connector according to claim 1 wherein said urging means is a spring.

3. A fluid connector according to claim 1 wherein said urging means is a compression spring.

4. A fluid connector according to claim 3 wherein said compression spring has a forward end extending toward said passageway opening for contacting said conduit leading end whereby said spring is compressed as said conduit in contact with said spring leading end is inserted into said housing passageway.

5. A fluid connector according to claim 4 wherein said spring includes a number of coils and said spring forward end includes coils having a mean diameter, and wherein said conduit has a fluid passageway with a diameter and said conduit leading end has an outside diameter, and wherein said mean diameter of said forward end coils is greater than said conduit fluid passageway diameter and less than said conduit leading end outside diameter.

6. A fluid connector according to claim 1 wherein said urging means is a conical compression spring.

7. A fluid connector according to claim 6 wherein said conical compression spring is made of stainless steel.

8. A fluid connector according to claim 1 wherein said housing includes a means for maintaining said urging means in said housing.

9. A fluid connector according to claim 8 wherein said maintaining means includes an annular groove for receiving a first end of said urging means.

10. A fluid connector according to claim 1 wherein said annular flange includes a trailing surface and said retaining legs include leading ends, and wherein said conduit has been inserted said predetermined distance when said retainer leg leading ends are in contact with said flange trailing surface.

* * * * *